May 3, 1960 R. A. STAUFFER Re. 24,821
METHOD OF PRODUCING METALS BY DECOMPOSITION OF HALIDES
Original Filed Sept. 24, 1949
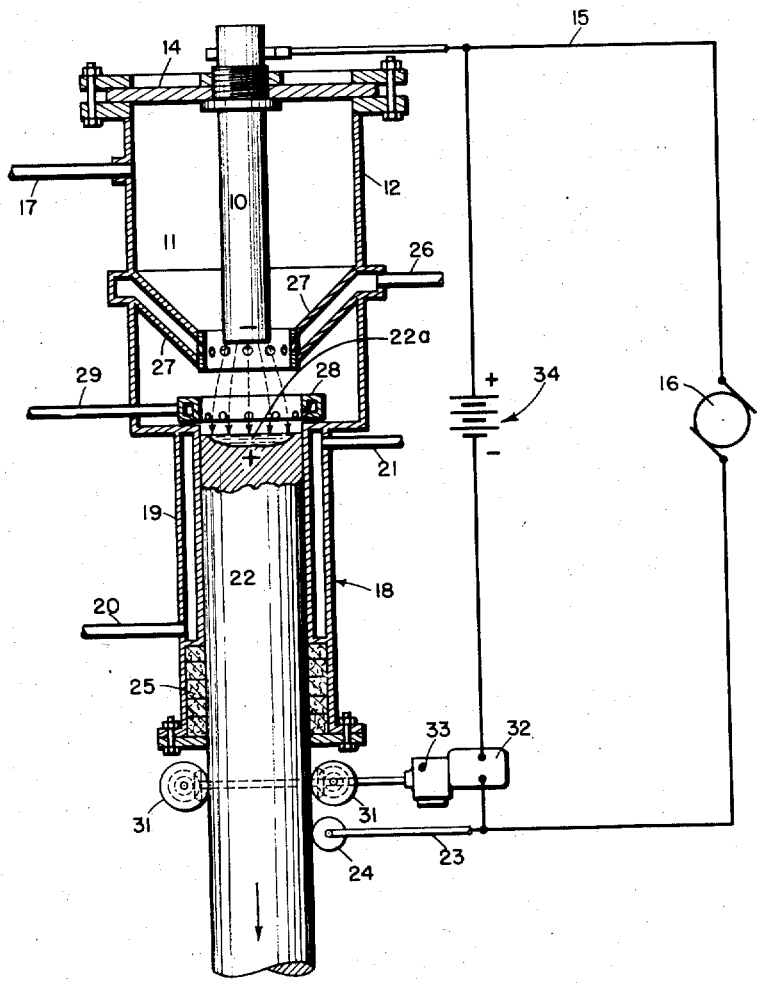
Robert A. Stauffer
Inventor
by Edgar H. Kent
Attorney United States Patent Office Re. 24,821

Reissued May 3, 1960

24,821

METHOD OF PRODUCING METALS BY DECOMPOSITION OF HALIDES

Robert A. Stauffer, Weston, Mass., assignor to National Research Corporation, Cambridge, Mass., a corporation of Massachusetts Original No. 2,768,074, dated October 23, 1956, Serial No. 117,522, September 24, 1949. Application for reissue September 25, 1958, Serial No. 763,780

10 Claims. (Cl. 75—10)

Matter enclosed in heavy brackets [ ] appears in the original patent but forms no part of this reissue specification; matter printed in italics indicates the additions made by reissue.

This invention relates to the production of metals which form compounds capable of being volatilized without substantial decomposition and of being decomposed at temperatures lower than the volatilization temperature of the metal.

The invention embraces improvements both in method and apparatus and is particularly concerned with the preparation of metals melting about 900° C., e.g., zirconium, titanium, vanadium, chromium, and hafnium. Metals produced according to the invention possess a high degree of purity adapting them for uses for which the metals as conventionally produced are unsuited. In the case of the higher melting metals, at least, this advantage is attained without increase in production costs, in fact the production costs are generally less. The invention extends to substances, as boron and silicon, which are not, in the strict sense, metals but which have many of the characteristics of metals and are regarded much in the same light. Such pseudo metals are to be considered as embraced by the term "metal" as used herein.

The invention will be described with particular reference to zirconium and titanium metal production since it is considered especially significant as thus applied.

Early investigators produced zirconium by thermally reducing the oxide. So produced the metal possesses little utility because of brittleness, apparently due to the presence therein of occluded gases, particularly oxygen and nitrogen. Later investigators were successful in producing the metal in ductile form, but their processes have never been made use of commercially because of the small yields they afford and because they are not adapted for continuous large scale operation. In one typical process, zirconium iodide is decomposed on a hot tungsten filament disposed within an evacuated vessel of heat resistant glass, the metal coating out on the filament. The apparatus must be cooled and dismantled periodically to recover the metal.

Recently, it has been proposed to produce ductile zirconium by reduction of zirconium chloride with magnesium in an atmosphere of argon. In such process, magnesium chloride is produced as a by-product and must be separated by sublimation at 1000° C. The process is further disadvantageous in that the product metal has the form of a sponge and must either be re-melted in vacuo and cast, or powdered and sintered in vacuo. At best, the product metal is considerably less ductile than the metal as prepared by the filament method, which offers relatively little opportunity for contamination of the metal with gases causing embrittlement.

In accordance with the present invention, the zirconium metal may be produced in quantity in a desirable ingot form and need not be re-melted and cast or otherwise subsequently treated by the prime producer.

The starting material in the case of the process herein, as has been indicated, is a volatile compound of the metal. Generally and preferably, a compound of the metal comprising one of the halogens-iodine, bromine or chlorine is employed.

According to the invention, the starting compound in vapor phase is charged to a decomposition zone wherein it is heated by means of an electric arc, maintained at substantially constant length, to a temperature resulting in dissociation of the metal from the other component or components of the compound. The product metal is discharged through an ingot-forming zone communicating with the decomposition zone. In the preferred form of the invention, the ingot in the ingot-forming zone is utilized as one of the electrodes between which the arc is passed and the product metal is collected by coalescence on the surface of the ingot contacted by the arc, the reaction products being caused to impinge on such surface. With this arrangement, arc length may be kept substantially constant by the controlled widthdrawal of the ingot at a rate conforming with the rate of deposition of the metal. Under optimum operating conditions, the arc maintains the upper surface of the ingot in molten condition. This aids materially in the coalescing of the product metal.

The invention, in both its process and apparatus aspects, will be better understood by reference to the accompanying schematic drawing illustrating a system of apparatus suitable for its practice. The apparatus will be described as applied in the production of metal from a metal halide.

In the drawing, the numeral 10 denotes an electrode, advantageously formed of carbon, disposed within a chamber 11, hereinafter referred to as the decomposition chamber, delineated by a ceramic lined metal tank 12 having a pressure tight lid 14 through which the upper portion of the electrode extends. The electrode, which should be suitably insulated, is connected above the lid 14 to an electric cable 15 extending to a direct current generator 16.

Tank 11 is provided with a connection 17 extending to a suitable vacuum pumping system, not shown. At its bottom the tank opens to a mold 18 having a jacket portion 19 provided with connections 20 and 21 for the ingress and egress, respectively, of a suitable cooling agent, normally water. An ingot 22 of the metal to be produced is partially confined by the mold 18 and serves as a second electrode, being connected to generator 16 via cable 23. Roller 24 enables downward movement of the ingot without interference with the electrical connection. Interposed between the mold 18 and the ingot are gaskets 25 which provide a pressure tight seal.

In operation of the system, an arc, indicated by the bent arrows in the drawing, is maintained between the electrode 10 and the ingot 22, the latter being at lower potential. This arc, as previously indicated, preferably maintains the upper surface of the ingot in molten condition. If desired, the operating conditions may be so controlled that only the center portion of the upper surface of the ingot is maintained molten as shown at 22a. In such event, the solid marginal areas or edges serve to confine the molten pool of metal.

The halide to be decomposed is introduced into the decomposition chamber 11 in the vapor state via a connection 26 serving a feeding ring or manifold 27 which operates to direct the halide downwardly through the arc. Below the element 27 and only very slightly above the surface of the ingot 22, is a second ring or manifold 28 which functions to collect the halogen dissociated from the metal during passage of the halide through the arc. Both manifolds 27 and 28 are preferably coated with a ceramic, similar to the lining on tank 12, to prevent accidental arcing to either of manifolds 27 or 28. The collected halogen is withdrawn from the system by means of line 29 which is connected to suitable evacuation means, as a mechanical backing pump working in combination with a refrigerated condenser. The negative pressure in the collection ring 28 serves to promote impingement of the reaction products on the surface of the ingot receiving the arc. Connection 17, by means of which the system is initially evacuated, may be used in the withdrawal of any of the gaseous reaction products which are not collected by the ring 28. This ring may be dispensed with entirely where the velocity of the entering vapors of itself assures impingement of the reaction products on the surface of the ingot.

Where superheating of the vaporized metal compound prior to its discharge into the decomposition zone is desired, the superheating may be accomplished by positioning ring element 27 somewhat closer to the electrode 10.

As the arc induced dissociation reaction proceeds, arc length decreases from the deposition of metal on the ingot. Advantageously, the resulting decrease in E.M.F. is utilized to actuate a pair of rollers 31 which move the ingot downwardly. As free ingot length increases sections or pigs of any desired length may be automatically produced as by a travelling saw, not shown.

Rotation of the rollers 31 can be so controlled as to provide a constant arc length, as is desirable, by the means indicated at the right hand side of the drawing, for example. Such means comprises a D.C. motor 32, operatively connected to the rollers 31 through speed reducing gears 33, and a constant voltage D.C. power supply 34, the circuit including the motor and power supply being in parallel with relation to the electrode circuit. The polarities of power supply 34 and generator 16 being opposite, as indicated, when the voltage of the power supply in the motor circuit is adjusted to equal the voltage between the electrode and ingot at the preferred arc length, no current flows in the motor circuit initially. However, when the arc length decreases from deposition of the metal on the ingot, the voltage between the electrode and ingot becomes less than the constant voltage supplied in the motor circuit. Under this circumstance, a net voltage is supplied across the motor, energizing the same and causing rotation of rollers 31.

It will, of course, be appreciated that the conditions under which the disclosed system is operated depend on the particular metal being produced and on the characteristics of the starting compound.

In producing zirconium metal from zirconium halides, the optimum total pressure is governed by the identity of the halide. In general, arc dissociation of zirconium halides depends upon the total pressure in the system. As pressure decreases, the percent dissociation increases. It has been found that when the tetraiodide is decomposed, the total pressure may be as high as 100 mm. Hg absolute. On the other hand, when the tetrabromide or tetrachloride is decomposed, the total pressure should be less than 10 mm. Hg absolute, preferably less than 1 mm. Hg absolute in the case of the tetrachloride. With the corresponding titanium compounds, total pressures may be generally somewhat higher. As used herein, the expression "total pressure" refers to the sum of the pressures of the introduced metal compound (e.g., the halide) and of the reaction product (e.g., the halogen). Such pressures does not include air pressure within the decomposition zone since substantially all of the air is evacuated from the chamber prior to the decomposition reaction in order to prevent contamination of the product metal.

Arc temperature varies with the compound being decomposed, the operating pressure, and electrode material. In the case of zirconium tetrachloride, the temperature of the vapor in the arc is usually upwards of 3000° C., although the decomposition will proceed at a lower temperature. Positive direction of the feed vapor through the arc and impingement of the reaction products on the surface of the ingot is essential if scattering of the product metal throughout the chamber is to be avoided.

A major advantage of the invention resides in the fact that the metal is produced continuously. In initial start-up, an ingot of previously prepared metal is placed in the mold and the system evacuated to a pressure of from $10^{-4}$ to $10^{-1}$ millimeters of mercury, for example. Thereafter, the feed vapor is introduced until the desired operating pressure is reached at which point the arc is struck. It is generally advantageous to preheat the feed vapor to a temperature between 350°–800° C.

Zirconium tetrachloride for use in the practice of the invention may be prepared in any suitable way. Perhaps the most suitable process is that developed by the United States Bureau of Mines. In such process, zircon is reduced with carbon in an electric furnace, the amount of carbon added being adjusted to promote the following reaction:

$$ZrSiO_4+4C \rightarrow ZrC+SiO+3CO$$

The zirconium carbide thus prepared is treated with chlorine at an elevated temperature, the chlorine reacting with the carbide to form the tetrachloride which being volatile at the reaction temperature vaporizes out of the reaction zone. Iron chloride and other chloride contaminants are separated from the zirconium tetrachloride product by resublimation of the product in an atmosphere of hydrogen.

Using the invention herein as a stage of an overall process for the production of zirconium metal from zircon, it is advantageous to cycle the chlorine resulting on the dissociation of the zirconium tetrachloride to the unit wherein the carbide is reacted with chlorine.

As has been indicated, the particular value of the invention with respect to zirconium stems from the fact that the metal is produced in ductile form in commercially significant quantities. The invention is of equivalent value with respect to titanium; this metal also being subject to embrittlement by oxygen and nitrogen which invariably become occluded in the metal as produced by procedures not providing for exclusion of these gases. Of the existing methods for producing ductile titanium, the filament method referred to in the forepart hereof, with its attendant disadvantages, has been most used.

Various changes may be made in the apparatus as disclosed by the drawing without departing from the scope of the invention. Thus, in some cases it may be advantageous to charge the feed vapor through a hollow electrode or to maintain the arc length constant by means other than those shown, means causing movement of the negative electrode, for example. In other cases, it may be advantageous to bubble the vapor from which the metal is directly derived through the molten metal on the surface of the ingot by means of a suitably resistant tube extending into the molten metal.

It is believed obvious that alloys of substantially any desired composition may be prepared in accordance with the invention by using mixed feed vapors.

This application is a continuation-in-part of my application Serial Number 44,253, filed August 14, 1948, now abandoned.

I claim:

1. The method of producing a metal from the class consisting of titanium and zirconium by decomposing a compound thereof from the class consisting of the tetrachlorides, tetraiodides and tetrabromides of titanium and zirconium, which comprises providing a solid body of said metal adjacent an electrode in a decomposition zone, removing substantially all of the air from said zone, maintaining an arc between said electrode and an upper surface of said metal body to maintain a molten pool of said metal on the upper surface of said body, vaporizing said metal compound, introducing a stream of said vaporized compound into said decomposition zone and directing said stream of vaporized metal compound through said arc and against the surface of said metal pool to effect the decomposition of said compound to the metal with coalescing of said dissociated metal on said pool, and removing the gaseous products of decomposition from said decomposition zone at a sufficient rate to maintain the total pressure of the introduced metal compound and of the reaction products in said decomposition zone below atmospheric pressure.

2. A method according to claim 1 wherein said compound is a tetraiodide of one of the metals zirconium and titanium and said pressure is maintained below about 100 mm. Hg absolute.

3. A method according to claim 1 wherein said compound is a tetrabromide of one of the metals zirconium and titanium and said pressure is maintained below 10 mm. Hg absolute.

4. A method according to claim 1 wherein said compound is a tetrachloride of one of the metals zirconium and titanium and said pressure is maintained below 1 mm. Hg absolute.

5. The method of producing a high-melting-point metal selected from the group consisting of titanium, zirconium, vanadium, chromium, and hafnium, in a high state of purity, said method comprising the steps of vaporizing a halide of said metal which is volatilizable without decomposition and decomposable at a temperature less than the volatilization temperature of said metal, providing an air-free zone between a pair of electrodes, one of said electrodes comprising a body of said metal, maintaining a portion of the upper surface of said body of metal molten by means of an arc between said electrodes, directing said vaporized metal halide through said arc and against the molten upper surface of said metal body to decompose said metal halide to said metal and to coalesce said produced metal on said molten surface, and separately removing from said zone said produced metal and the gaseous products of decomposition, said gaseous decomposition products being removed from said decomposition zone at a sufficient rate to maintain the total pressure of the introduced halide and the reaction products in the decomposition zone below atmospheric pressure.

6. The method of claim 5 wherein said metal body is withdrawn from said zone at a rate conforming substantially with the rate of deposition of metal thereon so as to maintain said arc length substantially constant.

7. The method of claim 5 wherein the sides of said metal body are cooled so as to confine a pool of molten metal on the upper surface of said metal body.

8. In the process wherein titanium is produced by the thermal dissociation of a halide selected from the group consisting of a chloride, an iodide and a bromide of titanium, the improvement, which comprises: melting titanium to form a molten pool of titanium; heating said molten pool by means of an electric arc that plays on the surface of said molten pool; and flowing said halide to form a stream that flows through said electric arc and then into contact with said surface of said molten pool, so that said halide dissociates thermally to yield particles of titanium which are collected by said molten pool.

9. In the process wherein a metal selected from the group consisting of titanium and zirconium is produced by the thermal dissociation of a halide selected from the group consisting of a chloride, an iodide and a bromide of said metal, the improvement, which comprises: melting said metal to form a molten pool of said metal; heating said molten pool by means of an electric arc that plays on the surface of said molten pool; and flowing said halide to form a stream that flows through said electric arc and then into contact with said surface of said molten pool, so that said halide dissociates thermally to yield particles of said metal which are collected by said molten pool.

*10. A method of producing a high-melting-point metal selected from the group consisting of titanium, zirconium, vanadium, chromium, hafnium, silicon, and boron, in a high state of purity, said method comprising the steps of vaporizing a halide of said metal which is volatizable without decomposition and decomposable at a temperature less than the volatilization temperature of said metal, providing an air-free zone between a pair of electrodes, one of said electrodes comprising a body of said metal, maintaining a portion of the surface of said metal electrode molten by means of an arc between said electrodes, flowing said vaporized halide through said arc and against the molten surface of said metal body to decompose said halide to said metal and to coalesce said produced metal on said molten surface, and separately removing from said zone said produced metal and the gaseous products of decomposition.*

References Cited in the file of this patent or the original patent

UNITED STATES PATENTS

| | | |
|---|---|---|
| 866,385 | Von Pirani | Sept. 17, 1907 |
| 872,351 | King | Dec. 13, 1907 |
| 900,207 | Reid | Oct. 6, 1908 |
| 1,046,043 | Weintraub | Dec. 3, 1912 |
| 1,249,151 | McKee | Dec. 14, 1917 |
| 1,671,213 | Van Arkel et al. | May 29, 1928 |
| 1,889,907 | Terry | Dec. 6, 1932 |
| 2,191,479 | Hopkins | Feb. 27, 1940 |
| 2,205,854 | Kroll | June 25, 1940 |
| 2,207,746 | Maier | July 16, 1940 |
| 2,240,231 | Stalhane | Apr. 29, 1941 |
| 2,369,233 | Hopkins | Feb. 13, 1945 |
| 2,445,670 | Hopkins | July 20, 1948 |
| 2,541,764 | Herres et al. | Feb. 13, 1951 |

OTHER REFERENCES

Parke et al.: "The Melting of Molybdenum in the Vacuum Arc," Metals Technology, September 1946, Technical Publication No. 2052, v. 13, No. 6 (12 pp.).

Metal Industry, Oct. 18, 1946, article by Kroll et al., pages 319–322, inclusive. Page 319 relied upon.

Browne: "Continuous Casting Alloys," Steel, Jan. 19, 1948 (pp. 74–76, 78).

Clauser: "Alloys Made by Electric Ingot Process Have Improved Properties," Materials and Methods, January 1948 (pages 57–62).

Herres et al.: "Arc Melting Refractory Metals," Steel, May 2, 1949 (pages 82–86, 135).